United States Patent Office 3,009,962
Patented Nov. 21, 1961

3,009,962
ORGANIC PEROXIDES
Nicholas A. Milas, Belmont, Mass., assignor to Research Corporation, New York, N.Y., a corporation of New York
No Drawing. Filed Aug. 21, 1958, Ser. No. 756,295
4 Claims. (Cl. 260—610)

This invention relates to a new group of organic peroxides and to a method of making them.

In my application Serial No. 417,860, filed March 27, 1954, now abandoned in favor of my application Serial No. 5,089, filed January 25, 1960, I disclosed the production of useful organic peroxides by the application of ozone to unsaturated organic compounds in the presence of carbonium ions. I have now found that alkyl hydroperoxides, such as t-butylhydroperoxide, are not appreciably decomposed by ozone and in the presence of unsaturated organic compounds the hydroperoxides react with the intermediate ozone addition products to form a novel class of organic peroxides which are stable, cheap to manufacture, and useful as catalysts in polymerization reactions and as accelerators of diesel fuel combustion. They can also be converted to useful organic compounds.

The ozonization reactions involved in the present invention are in part also disclosed in my aforementioned application:

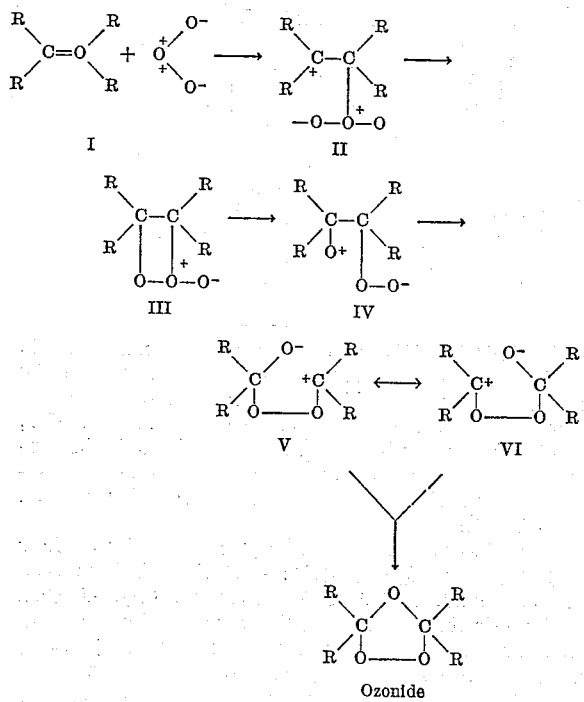

In the method of the present invention, before the ozonide is formed the ionic intermediates V and VI react with the alkyl hydroperoxide present in solution with the unsaturated compound to form a new class of organic peroxides:

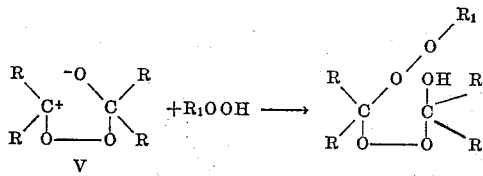

In the foregoing formulas R represents hydrogen or a hydrocarbon radical, at least one R being a hydrocarbon radical, and $R_1$ is a hydrocarbon radical.

If the substituents R on one of the carbon atoms of intermediates V and VI are the same as those on the other carbon atom, the intermediates are indistinguishable and the final products of reaction with the alkyl hydroperoxide are the same; otherwise, the final products from the two possible intermediates are isomeric, as illustrated in specific Reaction 2 below.

The following specific examples will illustrate the principles of the invention:

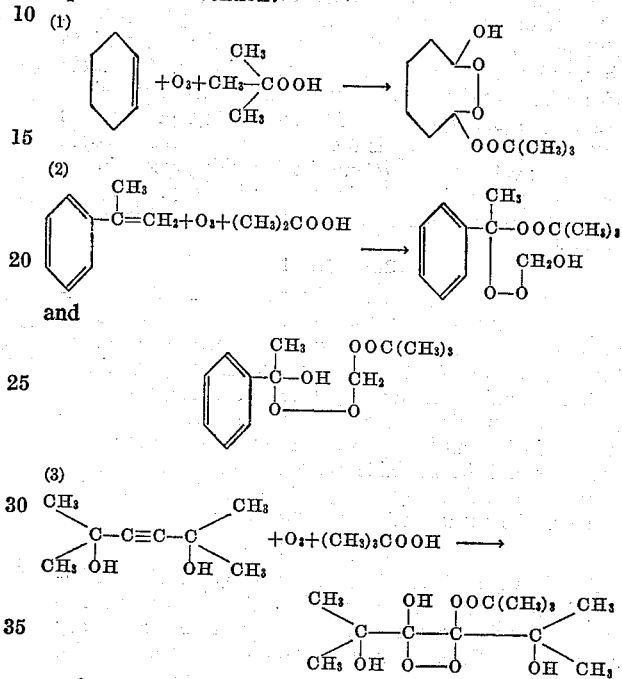

The present invention is not limited to tertiary alkyl hydroperoxides; secondary and primary alkyl hydroperoxides are also operable. Table I shows the peroxides produced from the olefins shown in column I.

TABLE I

*Organic peroxides from reaction of ozone with unsaturated compounds in the presence of t-butylhydroperoxide*

| Unsaturated compound | Peroxide | Yield of peroxide per mole of $O_3$ used |
|---|---|---|
| Pentene-1 | $C_9H_{20}O_5$ | 98.0 |
| 2-Methyl butene-2 | $C_9H_{20}O_5$ | 87.6 |
| 2,4,4-Trimethyl pentene-2 | $C_{12}H_{26}O_4$ | 95.0 |
| Cyclohexene | $C_{10}H_{20}O_5$ | 96.0 |
| Allo-Ocimene | $C_{22}H_{46}O_{15}$ | 94.0 |
| D-limonene | $C_{18}H_{36}O_{10}$ | 98.6 |
| α-Methyl styrene | $C_{13}H_{20}O_5$ | 94.6 |
| trans-Stilbene | $C_{16}H_{22}O_5$ | 98.0 |
| 2,5-Dimethyl 2,5-dihydroxy-hexyne-3 | $C_{12}H_{24}O_7$ | 99.5 |
| 9,10-Dimethylphenanthrene | $C_{20}H_{24}O_5$ | |

A more detailed description is given in the following illustrative examples:

EXAMPLE 1

A mixture of 2 g. of pentene-1 and 2.566 g. of t-butylhydroperoxide is made up with pure 1-butyl alcohol to 100 cc. and the solution allowed to absorb ozone at the rate of 0.0003718 mole per minute at 10° C. until an equivalent of one mole (0.02857 mole) of ozone per mole of pentene-1 is absorbed. The mixture is then allowed to stand at room temperature for one hour and the peroxide formed determined quantitatively. A yield of 98.0% of peroxide based on the ozone used is obtained.

EXAMPLE 2

A mixture of 5 g. of 2-methyl butene-2 and 6.43 g. of t-butylhydroperoxide is made up to 100 cc. with pure t-butyl alcohol and the solution is allowed to absorb dry ozone at 10° C. at the rate of 0.0006275 mole of ozone per minute until the equivalent quantity (0.0710 mole) of ozone per mole equivalent of 2-methyl butene-2 is absorbed. The mixture is then allowed to stand at room temperature for one hour—then the peroxide is determined quantitatively. A yield of 87.6% based on the ozone used is obtained.

EXAMPLE 3

A mixture of 5 g. of 2,4,4-trimethyl pentene-2 and 4.018 g. of t-butylhydroperoxide is made up to 100 cc. with pure t-butyl alcohol, and the solution allowed to absorb dry ozone at 10° at the rate of 0.0007254 mole per minute until the equivalent quantity (0.0446 mole) of ozone per mole equivalent of 2,4,4-trimethyl pentene-2 is absorbed. The solution is then allowed to stand at room temperature for one hour and the peroxide present in the reaction mixture is determined quantitatively. A yield of 95.0% of peroxide based on the ozone used is found to be present.

EXAMPLE 4

A mixture of 5 g. of cyclohexene and 5.488 g. of t-butylhydroperoxide is made up to 100 cc. with t-butyl alcohol and the solution allowed to absorb dry ozone at 10° at the rate of 0.000696 mole of ozone per minute until the equivalent quantity (0.06098 mole) of ozone per mole equivalent of cyclohexene is absorbed. The mixture is then allowed to stand at room temperature for one hour and the peroxide present in the mixture is determined quantitatively. A yield of 96.0% of peroxide based on the ozone used is found to be present.

EXAMPLE 5

A mixture of 2 g. of allo-ocimene and 3.97 g. of t-butylhydroperoxide is made up to 100 cc. with pure t-butyl alcohol and the solution allowed to absorb dry ozone at 10° C. at the rate of 0.0004724 mole per min. until a total of three mole-equivalents of ozone per mole of allo-ocimene is absorbed. The solution is then allowed to stand at room temperature for one hour and the peroxide present in the mixture is determined quantitatively. A yield of 94.0% of peroxide is obtained.

EXAMPLE 6

A mixture of 5 g. of D-limonene and 6.62 g. of t-butylhydroperoxide is made up to 100 cc. with t-butyl alcohol and the solution allowed to absorb dry ozone at 10° at the rate of 0.0006736 mole per minute until two mole-equivalents (0.07353 mole) of ozone per mole equivalent of D-limonene is absorbed. The solution is then allowed to stand at room temperature for one hour and the peroxide is determined quantitatively. A yield of 98.6% of peroxide is obtained.

EXAMPLE 7

A mixture of 5 g. of α-methyl styrene and 3.8134 g. of t-butylhydroperoxide is made up to 100 cc. with pure t-butyl alcohol and the solution allowed to absorb dry ozone at 10° C. at the rate of 0.0005884 mole of ozone per minute until a total of one mole-equivalent (0.042375 mole) of ozone per mole-equivalent of α-methyl styrene is absorbed. The solution is then allowed to stand at room temperature for one hour and the peroxide is determined quantitatively. A yield of 94.6% of peroxide is obtained.

EXAMPLE 8

A mixture of 2.5 g. of trans-stilbene and 1.25 g. of t-butylhydroperoxide is made up to 100 cc. with pure t-butyl alcohol and the solution allowed to absorb dry ozone at 10° C. at the rate of 0.000334 mole per minute until one mole-equivalent (0.01389 mole) of ozone per mole-equivalent of trans-stilbene is absorbed. The solution is then allowed to stand at room temperature for one hour and the peroxide present in the mixture is determined quantitatively. A yield of 98.0% of peroxide is obtained.

EXAMPLE 9

A mixture of 2 g. of 2,5-dimethyl-2,5-dihydroxyhexyne-3 and 1.2676 g. of t-butylhydroperoxide is made up to 100 cc. with pure t-butyl alcohol and the solution allowed to absorb dry ozone at 10° C. at the rate of 0.0004249 mole per minute until a total of one mole-equivalent (0.01408 mole) of ozone per mole-equivalent of 2,5-dimethyl-2,5-dihydroxyhexyne-3 is absorbed. The mixture is then allowed to stand at room temperature for one hour and the peroxide present in determined quantitatively. A yield of 99.5% of peroxide is obtained.

EXAMPLE 10

A solution of 0.5 g. of phenanthrene in 35 cc. of 90% t-butylhydroperoxide and 35 cc. of di-t-butyl peroxide was allowed to absorb at −20° 1 mole-equivalent of ozone based on the amount of phenanthrene used. The product is allowed to warm to room temperature and the solvent removed under reduced pressure (0.1 mm.). The residue is recrystallized several times from an ether-pentane mixture, M.P. 154.8–155° C.

*Analysis.*—Calcd. for $C_{18}H_{20}O_5$(I): C, 68.34; H, 6.37; for $C_{22}H_{28}O_6$(II): C, 68.02; H, 7.27. Found: C, 69.60; H, 7.40.

The infrared spectrum of this peroxide shows a weak band due to —OH, no band due to >C=O; strong bands due to t-butyl groups and strong bands due to dialkyl peroxide, —O—O—, groups. The peroxide has structure II with impurities of the peroxide I.

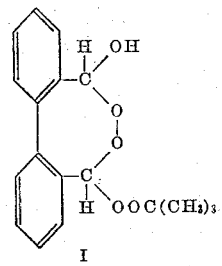
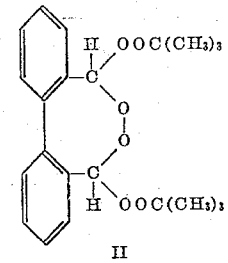

I
II

EXAMPLE 11

A solution of 0.796 g. of 9,10-dimethylphenanthrene in a mixture of 20 cc. of 90% t-butyl hydroperoxide and 20 cc. of di-t-butyl peroxide is allowed to absorb at 0° of 1 mole-equivalent of ozone based on the amount of 9,10-dimethylphenanthrene used. The solvent is then removed under reduced pressure (0.3 mm.) and the residue recrystallized from an ether-pentane mixture, M.P. 123–124° C.

*Analysis.*—Calcd. for $C_{20}H_{24}O_5$(I): C, 69.75; H, 7.02; (O), 9.29; for $C_{24}H_{32}O_6$(II): C, 69.20; H, 7.75; (O), 11.53. Found: C, 69.0, 69.2; H, 7.0, 7.0; (O), 9.0±0.4.

The infrared spectrum of this peroxide shows a weak band due to —OH groups, no band due to >C=O, strong bands due to t-butyl groups and to dialkyl peroxide, —O—O, groups. On the basis of the analytical data and the infrared spectrum it is apparent that the above peroxide has structure I rather than II.

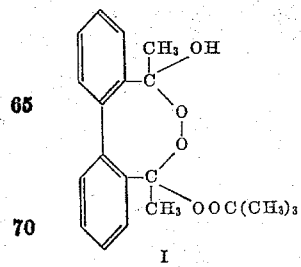
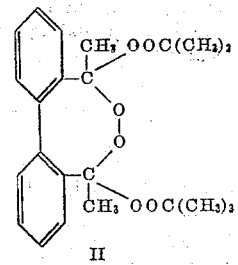

I
II

EXAMPLE 12

A solution of 2.5 g. of trans-stilbene in a mixture of 3.16 g. of t-butylhydroperoxide and 50 cc. of di-t-butyl peroxide is allowed to absorb at −10° 1 mole-equivalent of ozone based on the trans-stilbene used. The mixture is then allowed to stand at −10° overnight, then the solvent removed at 0° under reduced pressure (0.1 mm.). A highly viscous residue is obtained which failed to crystallize from several suitable solvents. This peroxide is stable at room temperature and when analyzed for active oxygen it gave values close to theoretical value.

*Analysis.*—Calcd. for $C_{18}H_{22}O_5$:(O), 10.06. Found: (O), 9.37 (average of several analyses).

From the decomposition products of this peroxide and analytical data, the following structure is found:

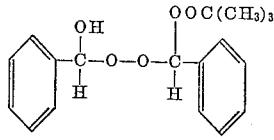

It is to be noted that while Examples 1–9 were carried out in t-butyl alcohol containing t-butylhydroperoxide, the experiments reported in the above examples were carried out in di-t-butyl peroxide containing t-butyl hydroperoxide and in the complete absence of t-butyl alcohol. This permits carrying out the ozonization below 0° C. thereby producing peroxides which are easier to isolate in the pure state. Industrially, however, t-butyl alcohol has an advantage since the peroxides produced are stable in solution and can be used directly in this solvent without isolation.

Although the examples given above are with t-butylhydroperoxide the invention is not limited to this hydroperoxide or to t-alkyl hydroperoxides.

I claim:

1. Organic peroxides of the formula

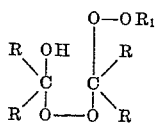

wherein R is selected from the group consisting of hydrogen and hydrocarbon radicals, at least one R being a hydrocarbon radical and $R_1$ is an alkyl hydrocarbon radical.

2. Organic peroxides of the formula

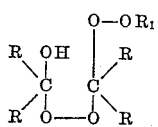

wherein R is selected from the group consisting of hydrogen and hydrocarbon radicals, at least one R being a hydrocarbon radical and $R_1$ is a tertiary alkyl hydrocarbon radical.

3. A method of making organic peroxides of the formula

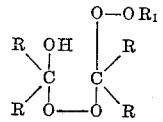

wherein R is selected from the group consisting of hydrogen and hydrocarbon radicals, at least one R being a hydrocarbon radical and $R_1$ is an alkyl hydrocarbon radical which comprises contacting a hydrocarbon of the formula

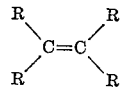

with ozone in the presence of an alkyl hydroperoxide.

4. A method of making organic peroxides of the formula

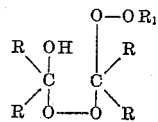

wherein R is selected from the group consisting of hydrogen and hydrocarbon radicals, at least one R being a hydrocarbon radical and $R_1$ is a tertiary alkyl hydrocarbon radical which comprises contacting a hydrocarbon of the formula

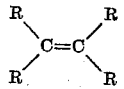

with ozone in the presence of a tertiary alkyl hydroperoxide.

References Cited in the file of this patent

UNITED STATES PATENTS

| | | |
|---|---|---|
| 2,455,569 | Dickey | Dec. 7, 1948 |
| 2,537,853 | Pezzaglia | Jan. 9, 1951 |